United States Patent
Mizuno et al.

[19]

[11] Patent Number: 5,823,028
[45] Date of Patent: Oct. 20, 1998

[54] CYLINDER LOCK AND KEY DEVICE

[75] Inventors: Takashi Mizuno; Sadao Kokubu; Hisashi Aoki; Yoshiyuki Mizuno, all of Aichi, Japan

[73] Assignee: Kabushiki Kaisha Tokai Rika Denki Seisakusho, Aichi, Japan

[21] Appl. No.: 814,682

[22] Filed: Mar. 11, 1997

Related U.S. Application Data

[63] Continuation of Ser. No. 579,887, Dec. 28, 1995, abandoned, which is a continuation-in-part of Ser. No. 253,490, Jun. 3, 1994, abandoned.

[30] Foreign Application Priority Data

Jun. 8, 1993 [JP] Japan ................................ 5-030710

[51] Int. Cl.$^6$ ................................................ E05B 49/00
[52] U.S. Cl. ................................................ 70/278; 70/277
[58] Field of Search ........................... 70/275, 277, 278, 70/245, 248, 252, 395, 408

[56] References Cited

U.S. PATENT DOCUMENTS

| | | | |
|---|---|---|---|
| 4,918,955 | 4/1990 | Kimura et al. . | |
| 4,924,686 | 5/1990 | Vonlanthen | 70/277 |
| 4,939,915 | 7/1990 | Vonlanthen | 70/277 |
| 5,003,801 | 4/1991 | Stinar et al. | 70/278 |
| 5,043,593 | 8/1991 | Tsutsumi et al. | 70/278 X |
| 5,117,097 | 5/1992 | Kimura et al. . | |
| 5,195,341 | 3/1993 | Niewkoop | 70/278 |

FOREIGN PATENT DOCUMENTS

| | | |
|---|---|---|
| 0 525 730 A1 | 2/1993 | European Pat. Off. . |
| 4125544A1 | 6/1992 | Germany . |
| 2204353 | 11/1988 | United Kingdom . |

*Primary Examiner*—Lloyd A. Gall
*Assistant Examiner*—Tuyet-Phuong Pham
*Attorney, Agent, or Firm*—Finnegan, Henderson, Farabow, Garrett & Dunner, L.L.P.

[57] ABSTRACT

A key-operated cylinder device includes a cylinder device body into which a key having a secondary coil is inserted, the cylinder device body including a coil mounting portion forming the front end portion of said cylinder device body; a primary coil mounted in said coil mounting portion, the primary coil wound on a coil bobbin; and shielding device for preventing the magnetic flux of the primary coil from flowing into the cylinder device body, the shielding device being arranged between the coil mounting portion and the primary coil.

5 Claims, 3 Drawing Sheets

CYLINDER LOCK AND KEY DEVICE

This application is a continuation of application Ser. No. 08/579,887, filed Dec. 28, 1995, now abandoned, which was a continuation of application Ser. No. 08/253,490, filed Jun. 3, 1994, now abadoned.

BACKGROUND OF THE INVENTION

1. Field of the invention

This invention relates to a key-operated cylinder device which is so designed that a primary coil is mounted on the front end portion of the cylinder device body into which the key is inserted.

2. Related Art

Recently, some automobiles have been provided with a so-called "wireless door lock device. The wireless door lock device is generally designed as follows: A signal transmitting circuit, and a power source, namely, a battery for the signal transmitting circuit are provided on the base of the key which is inserted not only into a key-operated cylinder device for ignition but also into a key-operated cylinder device for door, namely, a key-operated cylinder lock. The user operates the signal transmitting circuit to transmit a predetermined radio wave signal. The radio wave signal thus transmitted is received by a receiver provided on the vehicle, so that it is decoded by signal discriminating means. When it is determined that the signal is for the lock, a motor actuator is operated to automatically lock or unlock the door.

If, in the above-described wireless door lock device, the battery provided on the key is consumed up, then it becomes impossible to transmit the signal any longer; that is, it becomes impossible to automatically lock or unlock the door with the signal.

In order to overcome the above-described difficulty, the following key-operated cylinder device for ignition is proposed: A primary coil is provided on the side of the key-operated cylinder device for ignition. A secondary cell, which can be charged, is employed as the battery on the key. The secondary cell is connected to a secondary coil in a charging circuit. When the key inserted into the key-operated cylinder device is turned, the engine is started, so that the primary coil is energized. As the current in the primary coil changes, an electromotive force is induced in the secondary coil on the key, to charge the secondary cell.

That is, with the device, the secondary cell on the key can be charged during the operation of the engine.

However, the above-described device is disadvantageous in the following point: When the primary coil is energized, the magnetic flux produced by the latter acts on the rotor casing and the metal rotor of the cylinder device body which are made of metal, or on the cylinder device body, thus forming eddy currents therein. As a result, the output of the primary coil is lowered.

SUMMARY OF THE INVENTION

In view of the foregoing, an object of the invention is to provide a key-operated cylinder device having a primary coil in the front end portion of its cylinder device body in which the output of the primary coil is prevented from being lowered.

The foregoing object of the invention has been achieved by the provision of a key-operated cylinder device which, according to the invention, comprises: a cylinder device body into which a key having a secondary coil is inserted; a coil mounting portion forming the front end portion of the cylinder device body; a primary coil mounted in the coil mounting portion; and a shield plate made of a magnetic substance, which is interposed between the primary coil and the coil mounting portion.

When the primary coil is energized, the magnetic flux of the latter flows in the shield plate, so that the action of the magnetic flux on the cylinder device body is minimized, and accordingly the formation of eddy currents in the key cylinder body is also minimized. That is, the output of the primary coil is prevented from being lowered.

DETAILED DESCRIPTION OF THE PREFERRED EMBODIMENTS

Figure 1:
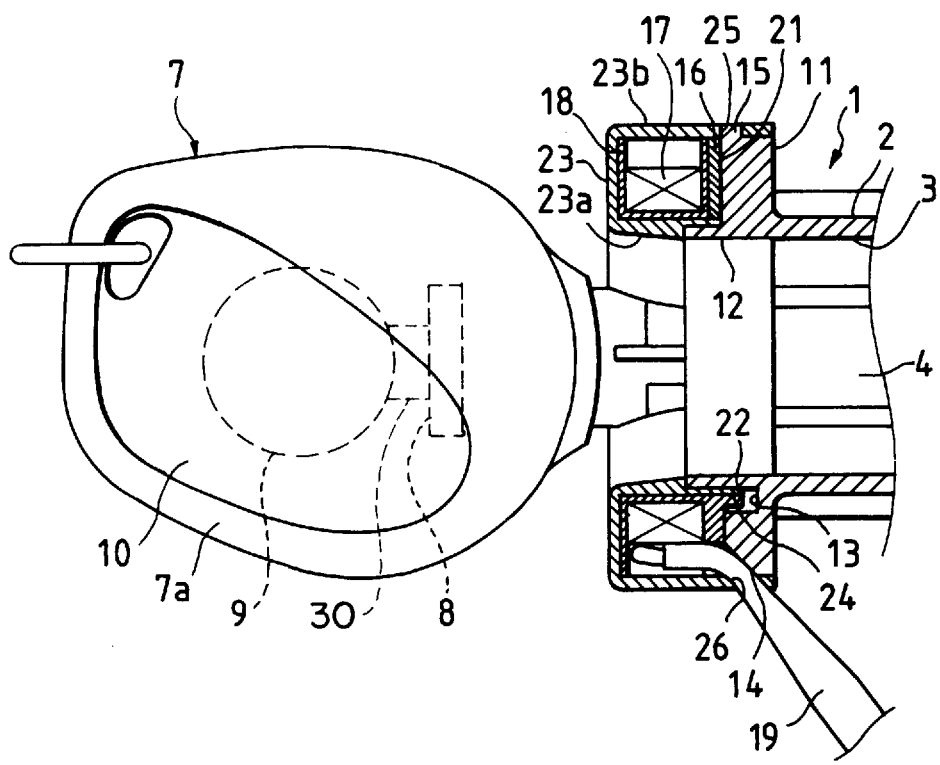
FIG. 1 is a fragmentary sectional view taken along line X—X in FIG. 2, showing essential components of a key-operated cylinder device, which constitutes one embodiment of this invention.

An example of a key-operated cylinder device for ignition, which constitutes one embodiment of the invention, will be described with reference to the accompanying drawings.

As shown in those drawings, the body 1 of the key-operated cylinder device (hereinafter referred to as "a cylinder device body 1", when applicable) comprises: a rotor casing 2; and a rotor 4 which is rotatably accommodated in a rotor accommodating portion 3 of the rotor casing. The rotor casing 2 and the rotor 4 are both made of zinc.

A key inserting channel 5 is formed in the rotor 4 in such a manner that it is extended axially. A rotor cover 6 is mounted on the front end face of the rotor 4. A plurality of tumblers (not shown) are movably provided in the rotor.

In the rotor 4, as is well known in the art, when a key 7 predetermined for the key-operated cylinder device is inserted into the key inserting channel 5, the tumblers are retracted inside the rotor 4, thus permitting the rotation of the rotor; whereas when a key different from the predetermined key 7 is inserted into the key inserting channel 5, some of the tumblers are protruded outwardly, thus inhibiting the rotation of the rotor 4. An ignition switch (not shown) is provided behind the rotor 4 which is operated as the rotor 4 is turned.

On the base 7a of the key 7, provided are a secondary coil 8, a chargeable secondary cell 9, a signal transmitting circuit (not shown) operating on the secondary cell 9, and an operating button 10 for activating the signal transmitting circuit. A charging circuit 30 connects the secondary coil 8 to the secondary cell 9. In response to the operation of the operating button 10, the signal transmitting circuit transmits a radio wave signal.

Figure 3:
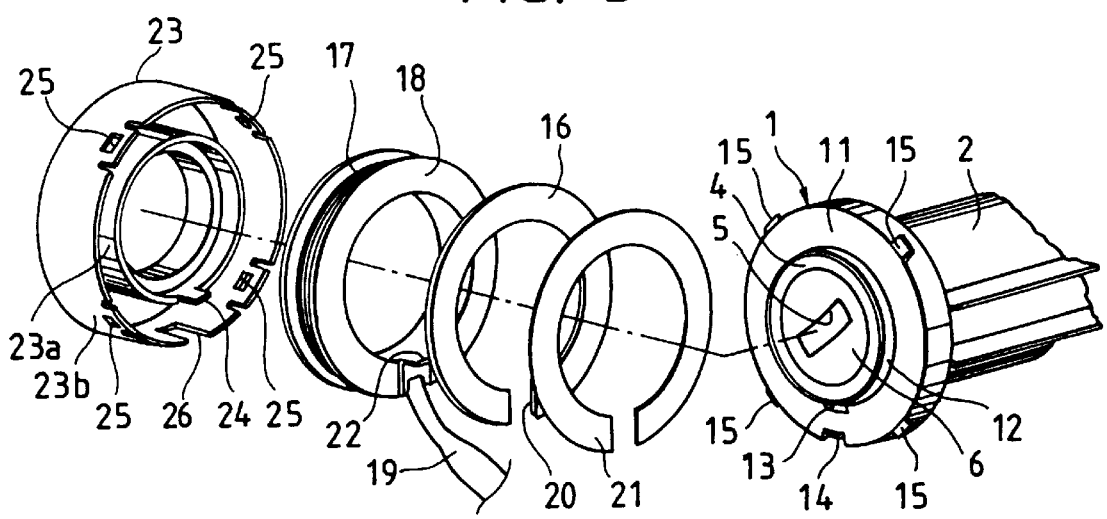
FIG. 3 is an exploded perspective view showing essential components of the key-operated cylinder device.

On the other hand, the front end portion of the rotor casing 2 is formed into a coil mounting portion 11 which is in the form of an annular flange. As shown in FIG. 3, the coil mounting portion 11 includes on its front end face: a short hollow cylinder 12 at the center which surrounds the rotor 4; an engaging recess 13 near the short hollow cylinder 12; a cord guide 14 formed in the outer periphery in such a manner that it is sloped and is located near the engaging recess 13; and four engaging ears 15 extended outwardly from the outer periphery.

A shield plate 16 of magnetic material is placed on the front end face of the coil mounting portion 11, and a plastic bobbin 18 on which a primary coil 17 has been wound, is set on the front surface of the shield plate 16. A cord 19, the lead wires of which are connected to the primary coil 17, is extended outside.

The shield plate 16 is made of permalloy, and it is C-shaped, or in the form of an open ring with a gap 20 the width of which corresponds to the width of the engaging recess 13. The shield plate 16 is mounted on the short hollow cylinder 12. A seal made from polyester sheet or the like is bonded onto the shield plate 16 to insulate the shield plate 16 from the coil mounting portion 11.

The bobbin 18 is annular in correspondence to the coil mounting portion 11, and has a first protrusion 22 on its rear surface. With the first protrusion 22 engaged with the engaging recess 13, the bobbin 18 is mounted on the short hollow cylinder 12 of the coil mounting portion 11.

A plastic cover 23 is mounted on the coil mounting portion 11 from the front, covering the primary coil 17 and the bobbin 18. The cover 23 is in the form of a dual pipe made up of a stepped inner cylinder 23a and an outer cylinder 23b. The inner cylinder 23a has a second protrusion 24 extended from the rear edge. The outer cylinder 23b has four engaging holes 25, and a cut-out 26 in correspondence to the second protrusion 24.

Figure 2:
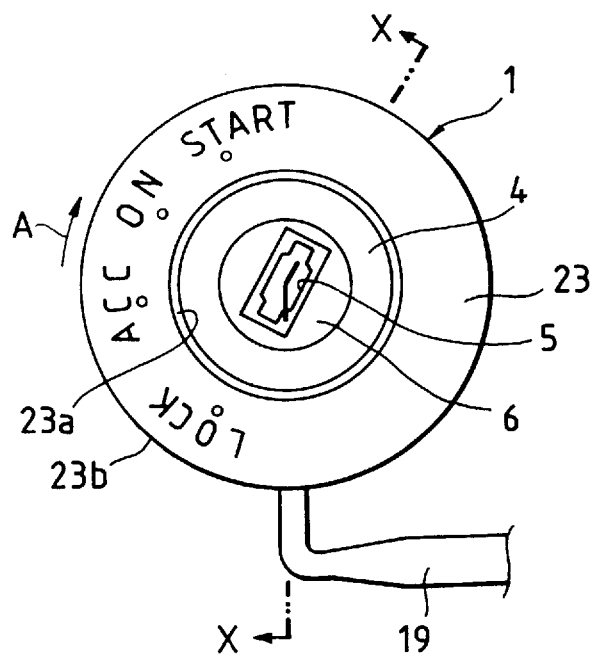
FIG. 2 is a front view of the body of the key-operated cylinder device shown in FIG. 1.

As shown in FIG. 2, the characters "LOCK", "ACC", "ON" and "START" are marked on the front surface of the cover 23 to indicate the positions of the rotor 4 (i.e., the states of the ignition switch).

In order to mount the cover 23 on the coil mounting portion 11 from the front, the inner cylinder 23a is engaged with the short hollow cylinder 12, while the outer cylinder 23b is put on the coil mounting portion 11 with the engaging holes 25 engaged with the engaging ears 15.

With the cover 23 mounted on the coil mounting portion 11, the cord 19 is extended outwardly through the cut-out 26 as shown in FIG. 1. The cord 19 is connected to a control device (not shown) provided on the vehicle.

Now, a procedure of mounting the shield plate 16, the bobbin 18 and the cover 23 on the cylinder device body 1 will be described.

First, with the cover 23 laid on its front surface, the bobbin 18, on which the primary coil 17 has been wound, is inserted between the inner cylinder 23a and the outer cylinder 23b of the cover 23, while the first protrusion 22 is laid on the second protrusion 24, and the cord 19 is extended through the cut-out 26.

Next, the shield plate 16, on one side of which the seal 21 is bonded, is placed on the bobbin 18 in such a manner that the seal 21 is exposed (the other side of the shield plate 16 being on the side of the bobbin 18) while the gap 20 is engaged with the first and second protrusions 22 and 24.

Thereafter, with the first and second protrusions 22 and 24 in alignment with the engaging recess 13 and with the cord 19 in alignment with the cord guide 14, the coil mounting portion 11 is press-fitted in the cover 23. As a result, the first and second protrusions 22 and 24 are fitted in the engaging recess 13, and the inner cylinder 23a is fitted onto the short hollow cylinder 12, and the outer cylinder 23b is fitted on the outer cylindrical surface of the coil mounting portion 11, and the engaging holes 25 of the outer cylinder 23b are engaged with the engaging ears 15 of the coil mounting portion 11.

Thus, the shield plate 16, the bobbin 18, and the cover 23 have been mounted on the cylinder device body 1. More specifically, the shield plate 16, the bobbin 18, and the cover 23 have been positively held in position on the coil mounting portion 11.

When, with the key 7 inserted into the key inserting channel 5 of the rotor 4, the latter 4 is turned from the position "LOCK" in the direction of the arrow A (FIG. 2) to the position "START", the starter (not shown) is operated to start the engine. When the key 7 is released. the rotor 4 is automatically returned to the position "ON".

In response to the start of the engine, the control unit (not shown) provided on the vehicle energizes the primary coil 17 to control the latter 17. As the current in the primary coil 17 changes, an electromotive force is induced in the secondary coil 8 provided on the key 7, to charge the secondary cell 9 on the key 7.

In this operation, since the shield plate 16 made of magnetic substance is interposed between the bobbin 18, on which the primary coil 17 is wound, and the coil mounting portion 11 of the rotor casing 2, the magnetic flux of the primary coil 17 flows into the shield plate 16, so that the action of the magnetic flux on the rotor casing 2 and the rotor 4 is minimized. Accordingly, the formation of eddy current in the cylinder device body 1 by the magnetic flux is also minimized. Thus, the output of the primary coil is prevented from being lowered; that is, the magnetic flux of the primary coil 17 can be effectively applied to the secondary coil 8.

In the above-described embodiment, a seal 21 is bonded onto the shield plate 16 to insulate the latter 16 from the coil mounting portion 11, so that the magnetic flux flowing in the shield plate 16 is more positively prevented from leaking into the coil mounting portion 11; that is, the output of the primary coil 17 is more positively prevented from being lowered.

In the above-described embodiment, the shield plate 16 is made of permalloy; however, it may be made of ferrite or amorphous material. The invention has been described with respect to the key-operated cylinder device for ignition. Of course, the technical concept of the invention may be applied to key-operated cylinder devices for doors, namely, key-operated cylinder locks. For example, instead of the secondary coil 8 and the secondary cell 9, a transponder may be employed. The transponder is constituted of the secondary coil and the signal transmitting circuit. The power is applied from the primary coil. A radio wave signal (identify code or the like) is transmitted when a voltage reaches a predetermined value. Namely, the secondary coil serves as a primary coil. The transponder is embedded into the key.

Figure 4:
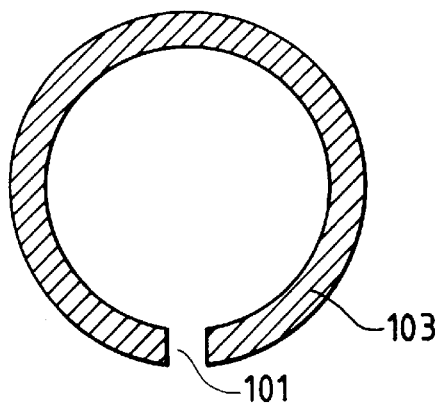
FIGS. 4–7 are perspective views showing a shield plate made of amorphous sheet of the present invention.
Figure 5:
Figure 7:
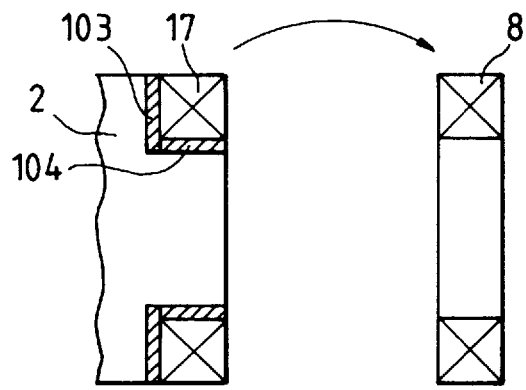

In the following embodiment such as a modified embodiment, the shield plate is made of amorphous material. As shown in FIGS. 4 and 7, Amorphous sheet 103 is in a circular shaped and, has an insulating sheet 21 on its one surface and a cut-out 101 to prevent the formation of eddy currents in it. Amorphous sheet 104 also has an insulating sheet 21 on its one surface, and no eddy current flows in it even when, in sticking it onto the cylindrical surface on a bobbin, its both end portions are overlapped with each other.

When the amorphous sheets 103 and 104 are assembled, the amorphous sheet 103 is stuck onto the bottom of the bobbin with the insulating sheet on the side of the rotor case 2, while the amorphous sheet 104 is stuck on the outer cylindrical surface of the bobbin 18 with the insulating sheet 21 on the side of the primary coil 17 (in this case, the insulating sheet 21 may be eliminated if both end portions are not overlapped with each other or if the amorphous sheet 104 is not contacted with the rotor case 2) or the amorphous sheet 104 is stuck on the inner cylindrical surface of the bobbin 18 with the insulating sheet 21 on the side of the rotor case 2. It is capable for omitting one of amorphous sheets 103 and 104 depending on the configuration of the rotor case. Moreover, to acheive a sheilding object, it is capable for employing the amorphous sheet 104 disposed stuck on the inner cylindrical surface of the bobbin 18, only.

Figure 6:
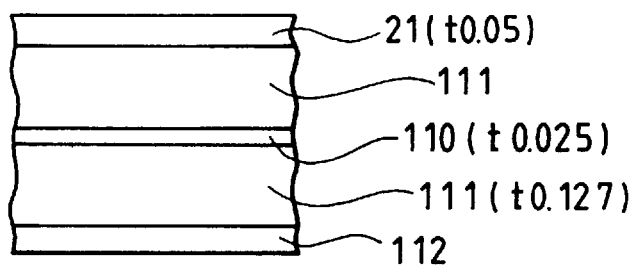

As shown in FIG. 6, the amorphous sheet 110, adhesive layer 111 or the like is considerably thin, for instance 0.025 mm. Even when the insulating polyester sheet 21, and adhesive layers 111 are provided on it, the resultant amorphous sheet 103 or 104 is not more than 0.5 mm. Hence, the use of the amorphous sheets makes it possible to install the power transmitting coil device in an extremely small space which is able to transmit power with high efficiency.

As was described above, in the key-operated cylinder device in which the front end portion of the cylinder device body, into which the key with the secondary coil is inserted, is formed into the coil mounting portion, in which the primary coil is mounted; the shield plate made of magnetic substance is interposed between the primary coil and the coil mounting portion, so that the action of the magnetic flux on the key cylinder body is minimized, and accordingly the output of the primary coil is prevented from being lowered. That is, the magnetic flux can be effectively applied to the secondary coil. This effect should be highly appreciated.

What is claimed is:

1. A cylinder lock and key device in combination with an ignition switch and a wireless lock device, the cylinder lock and key device comprising:

a rotor rotatable from a locked off position to an unlocked on position;

a cylinder lock body surrounding said rotor and including a coil mounting portion forming a front end portion of said cylinder lock body;

a primary coil wound on a coil bobbin mounted in said coil mounting portion, said primary coil being connected to a control device for energizing said primary coil when said rotor is in the unlocked on position;

shielding means mounted in said cylinder lock body for preventing magnetic flux of the primary coil from flowing into the cylinder lock body, the shielding means being arranged between the coil mounting portion and the primary coil; and a key having a secondary coil connected to a power cell in a charging circuit, said key being insertable into the cylinder lock body through a central opening in the coil bobbin, said key operable to rotate said rotor to the unlocked on position thereby allowing said control device to energize said primary coil to achieve magnetic coupling of the primary and secondary coils to charge the power cell, the power cell being for powering a signal transmitting circuit for transmitting a signal to the wireless lock device separate from the cylinder lock and key device.

2. A cylinder lock and key device as claimed in claim 1, wherein the shielding means is made of at least one of permalloy and is amorphous.

3. A cylinder lock and key device as claimed in claim 2, wherein the shielding means includes an insulating film to insulate the primary coil from the coil mounting portion.

4. A cylinder lock and key device as claimed in claim 1, wherein the shielding means is arranged on a cylindrical surface of the bobbin.

5. A cylinder lock and key device as claimed in claim 1, wherein the shielding means is arranged onto a bottom of the bobbin.

* * * * *